Figure 1:
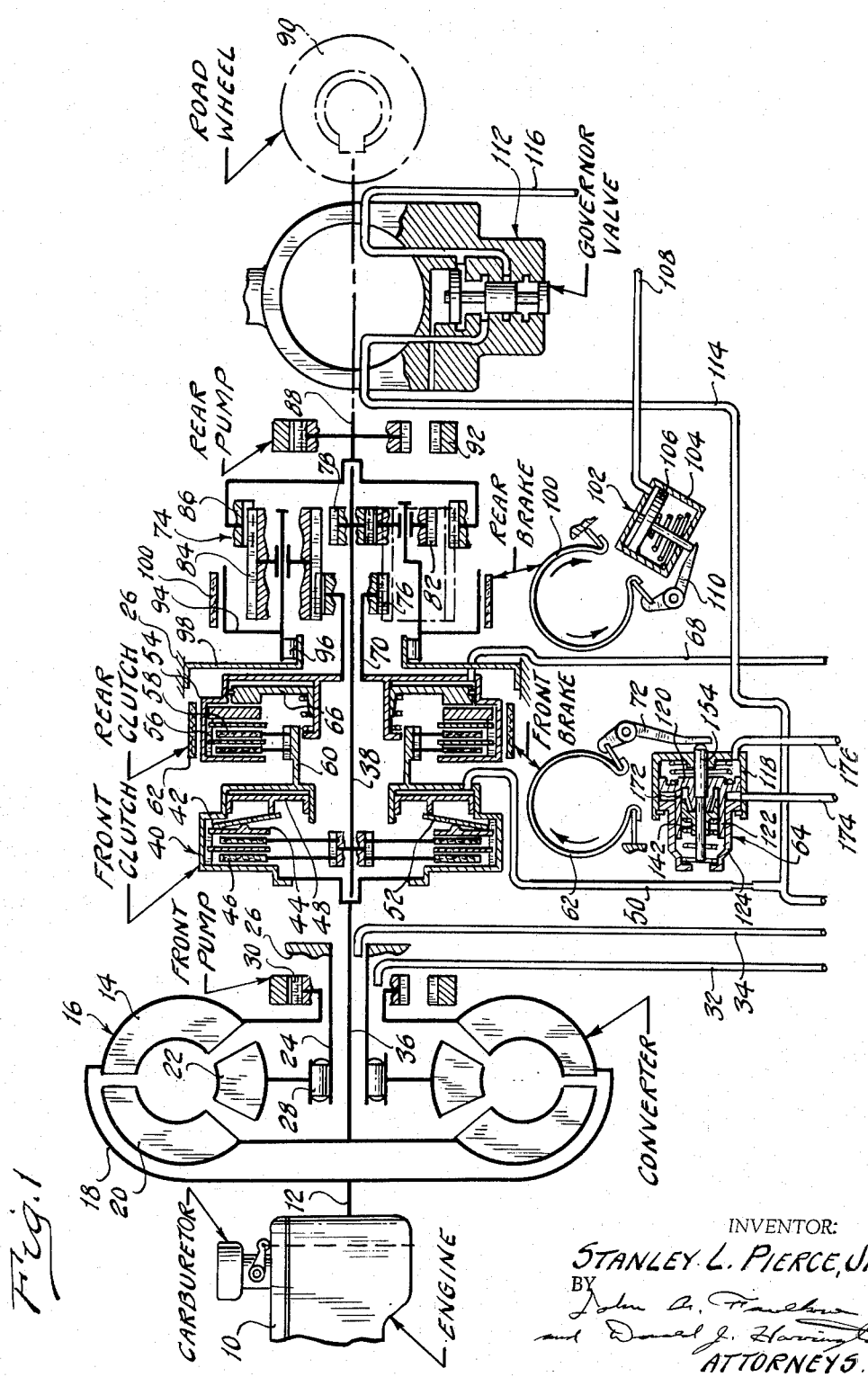

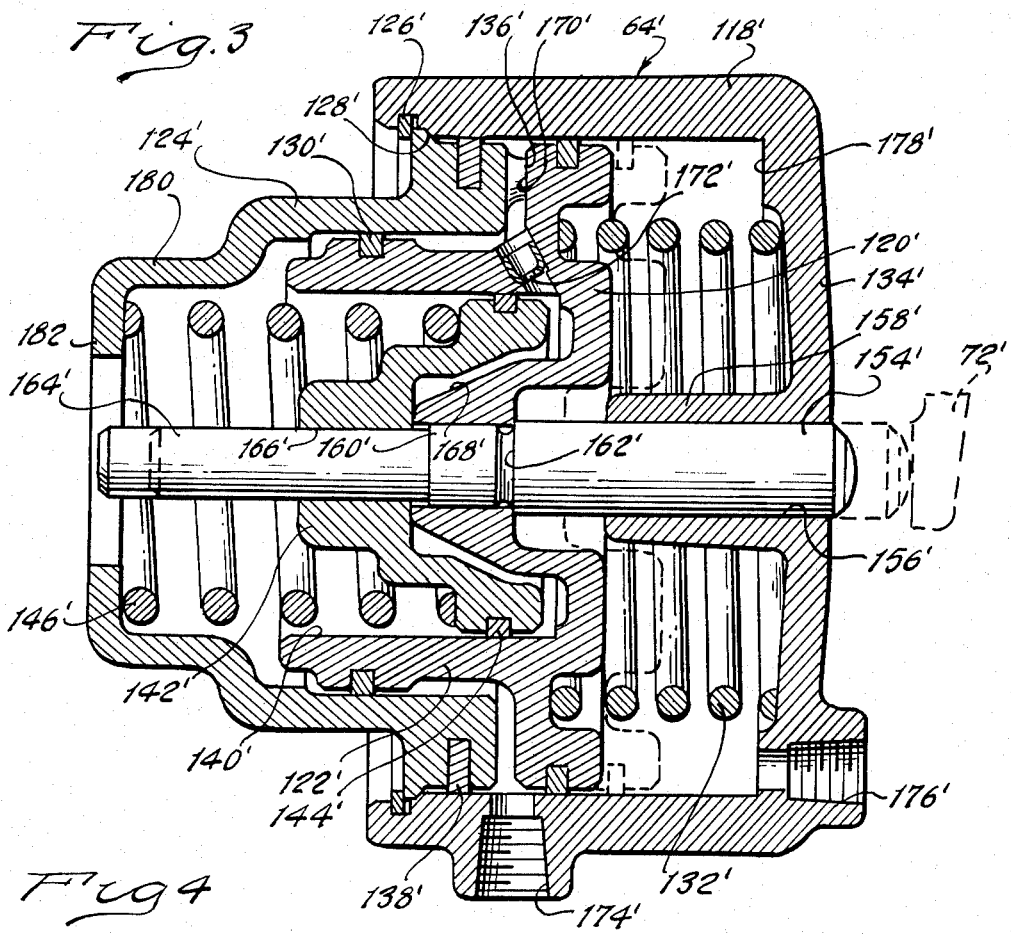
Fig. 3
Fig. 4
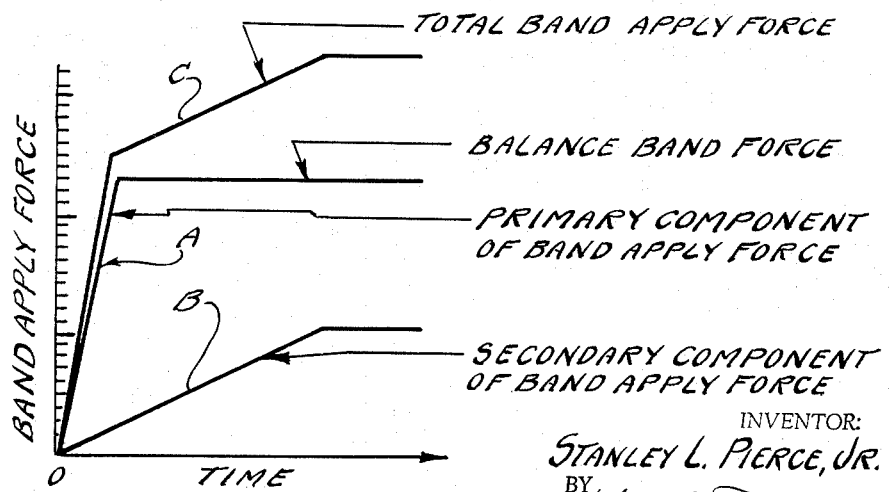
INVENTOR:
STANLEY L. PIERCE, JR.
BY
ATTORNEYS.

United States Patent Office 3,241,464
Patented Mar. 22, 1966

3,241,464
FLUID PRESSURE OPERATED SERVO WITH PARTIAL PRESSURE ACCUMULATION
Stanley L. Pierce, Jr., Madison Heights, Mich., assignor to Ford Motor Company, Dearborn, Mich., a corporation of Delaware
Filed Feb. 10, 1964, Ser. No. 343,528
6 Claims. (Cl. 92—60)

My invention relates generally to fluid pressure operated servos for friction torque establishing devices, and more particularly to a fluid pressure operated servo and accumulator system for use in a control circuit for a multiple speed ratio power transmission mechanism.

I contemplate that my improved servo construction may be used in an automotive vehicle driveline for engaging and releasing a friction brake that is capable of anchoring the reaction element of a multiple speed ratio gear system to condition it for torque delivery.

The gear system may be conditioned for operation in either a high speed ratio or a lower underdrive ratio by releasing the reaction brake and applying it in sequence with the application and release of a companion clutch that connects together two elements of the gear system for rotation in unison.

It is an object of my invention to provide a fluid pressure operated servo for use in such an environment wherein provision is made for obtaining optimum shift quality as a speed ratio change is initiated.

It is a further object of my invention to provide a fluid pressure operated servo for controlling the application and release of a friction brake band in a transmission clutch and brake system wherein the braking action of the servo and brake band is modified by an accumulator system during the late stages of the time interval required to apply the brake with its full braking capacity.

It is a further object of my invention to provide a fluid pressure operated servo with a pressure accumulating feature wherein the pressure accumulator structure is located physically within the structure of the servo itself thereby reducing to a minimum the overall space requirements.

I am aware of several conventional accumulator systems for use with fluid pressure operated servos, but these usually comprise a pressure accumulator chamber that is in fluid communication with a pressure source through a flow restricting orifice. The accumulator chamber is located in parallel relationship with respect to the servo pressure chamber on the downstream side of the orifice. During the interval in which the brake capacity is increased upon a speed ratio change, the accumulator modifies the rate of pressure build-up in the entire servo chamber. In my improved system, however, the accumulator system is effective to modify the rate of pressure build-up only on a portion of the effective working area of the servo apply chamber. In this way the rate of change of the force applied to the friction brake band is reduced thereby creating a more effective cushioning in the application of the band.

In a clutch and brake system of this type with the brake acting as a reaction point in a geared automotive vehicle driveline, the reaction element of the gear system decelerates as the brake servo gains capacity. When the angular velocity of the decelerating member approaches zero, the coefficient of static friction of the friction brake surfaces, which is substantially greater than the coefficient of dynamic friction, accounts for an abrupt change in the angular velocity until it reaches zero. This is accompanied by a sharp increase in the inertia forces in the gear system and by a so-called "shift feel" as the ratio change takes place. It is an object of my invention to eliminate this so-called "shift feel" by reducing substantially the rate of change of force applied to the friction brake band during the late stages of the shift interval.

It is a further object of my invention to provide a servo with an inherent accumulator system wherein two servo pressure chambers are used, the chambers being in fluid communication through a flow restricting orifice.

It is a further object of my invention to provide a servo system of the type set forth in the preceding object wherein only one of the pressure chambers of the servo is affected by the accumulator structure although the ultimate servo capacity is proportional to the sum of the magnitudes of the pressures in both chambers.

Figure 2:
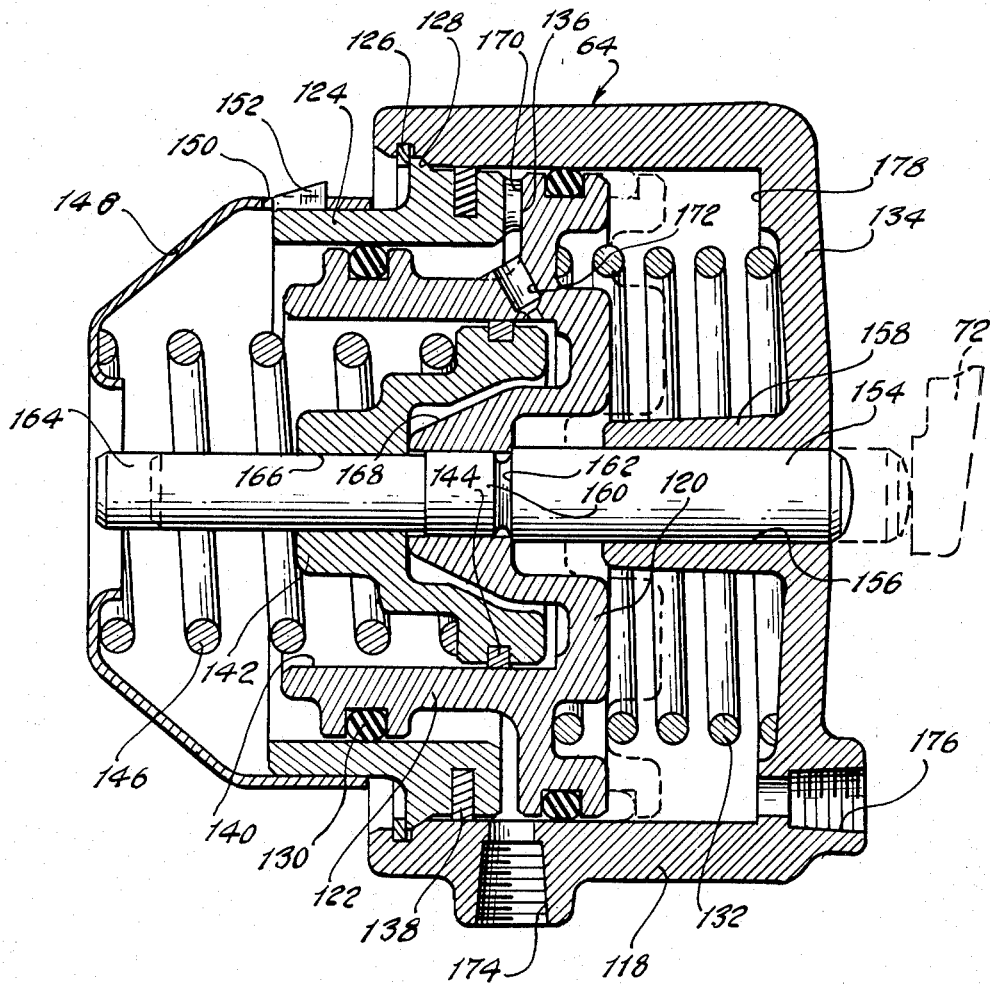

Further objects and features of my invention will become apparent from the following description and the accompanying drawings, wherein:

FIGURE 1 shows in schematic form a multiple speed ratio power transmission mechanism capable of embodying the improved servo arrangement of my invention, FIGURE 2 is a cross sectional sub-assembly view of a first form of my improved servo structure, FIGURE 3 shows a modification of the structure of FIGURE 2, and FIGURE 4 shows a chart that indicates the relationship between servo apply time and servo apply force.

Referring first to FIGURE 1, the numeral 10 designates an internal combustion vehicle engine having a crankshaft 12 which is connected drivably to the impeller 14 of a hydrokinetic torque converter mechanism shown generally at 16. The connection between the crankshaft 10 and the impeller 14 is formed by a torque transmitting drive shell 18.

The impeller 14 includes a plurality of circumferentially spaced impeller blades that define radial outflow passages. These passages are in toroidal fluid communication with radial inflow passages defined by turbine blades which form a part of a hydrokinetic turbine 20.

A bladed stator 22 is situated between the flow exit region of the turbine 20 and the flow entrance region of the impeller 14. It is supported by stationary stator shaft 24 which in turn may be connected to the transmission housing shown in part at 26.

The stator 22 is connected to the stator sleeve shaft 24 by means of an overrunning brake 28. This brake inhibits relative rotation of the stator 22 in the direction of rotation of the impeller but accommodates free-wheeling motion thereof in the opposite direction.

The impeller 14 is drivably connected to a positive displacement front pump 30 which includes pump gear elements journaled within a pump cavity formed in a portion of the transmission housing. This pump provides a pressure source for fluid pressure operated servos subsequently to be described.

Fluid pressure is distributed to an automatic control valve system (not shown) through a pressure supply passage 32 that communicates with the high pressure side of the pump 30. The low pressure side of the pump 30 communicates with a low pressure transmission sump which acts as a fluid reservoir.

The pump 30 also acts as a pressure source for supplying the torus cavity of the converter 16 with fluid. By preference, a separate pressure regulator valve for the converter 16 is used so that converter supply fluid is maintained at a desired pressure level.

Passage 34 acts as a flow return passage for the torus cavity of the converter 16.

Turbine 20 is connected to a turbine shaft 36 which may be connected in turn to a sun gear shaft 38 by means of a selectively engageable fluid pressure operated friction clutch shown at 40. This clutch includes a clutch drum 42 which carries clutch discs 44. The discs are situated in interdigital relationship with respect to clutch discs 46 carried by the shaft 38. A fluid pressure operated piston 48 is disposed in a fluid pressure cylinder defined by the drum and it cooperates therewith to define a pressure cavity that is supplied with clutch pressure through passage 50. An annular Belleville spring actuator 52 is disposed between the discs and the piston 48 so that the piston force can be multiplied. Spring disc 52 also acts as a return spring for the piston 48.

Brake drum 54 carries externally splined friction discs 56. These are situated in interdigital relationship with respect to brake discs 58 carried by an extension 60 of the drum 42, the latter being connected to shaft 36.

A brake band 62 which surrounds drum 54 may be applied and released by means of a suitably fluid pressure operated servo that is indicated generally in FIGURE 1 by reference character 64. Drum 54 defines an annular cylinder within which is situated an annular piston 66. Fluid pressure can be admitted to the chamber defined by the piston 66 and its cooperating cylinder through a pressure feed passage 68. This engages frictionally the friction discs 56 and 58 of this so-called rear clutch thereby establishing a direct connection betwen shaft 36 and a sun gear sleeve shaft 70.

Brake band 62 can be applied and released by means of a linkage mechanism 72. This mechanism can be urged to a brake applying position by means of the piston member of the fluid pressure operated servo 64 which will be described more particularly with reference to FIGURES 2 and 3.

The planetary gear unit shown at 74 includes a first sun gear 76 of relatively large pitch diameter and a second sun gear 78 of smaller pitch diameter. Sun gear 76 is connected to the sun gear sleeve shaft 70 and sun gear 78 is connected to the sun gear shaft 38.

Sun gear 78 engages a set of short planet pinions 82 which in turn engage a set of long planet pinions 84. The pinions 84 also engage sun gear 76.

A ring gear 86 drivably engages long planet pinions 84 and is connected drivably to power output shaft 88 which in turn is connected drivably to the vehicle road wheels 90 through a suitable driveline arrangement. A positive displacement rear pump 92 is connected drivably to the shaft 88 and is caused to develop pressure whenever the shaft 88 rotates.

The planet pinions 80 and 82 are carried by a common carrier 94. An overrunning brake 96 is adapted to anchor the carrier 94 against rotation in one direction but it permits freewheeling motion thereof in the opposite direction. One race of the brake 96 is defined by a stationary wall 98 which is supported by the transmission housing shown in part at 26.

Carrier 94 defines a brake drum about which is positioned a friction brake band 100. This brake band can be applied and released selectively by menas of a fluid pressure operated servo 102. This servo comprises a cylinder 104 and a cooperating servo piston 106. Fluid pressure can be admitted to a pressure cavity defined by the cylinder 104 and piston 106 through a feed passage 108. A motion transmitting linkage 110 transmits the fluid pressure force acting upon the piston head 106 to the unanchored end of the brake band 100.

A governor valve arrangement 112 is connected drivably to the power output shaft 88. It is supplied with fluid pressure through the passage 114 and modulates it to produce a resultant pressure signal in passage 116 which is related in magnitude to the speed of rotation of the shaft 88.

To establish first speed ratio operation in a forward driving direction it merely is necessary to apply the front clutch by pressurizing passage 50. Turbine torque then is delivered to shaft 36 and through the front clutch to the rear sun gear 78. The carrier 94 acts as a reaction member. Since the carrier is anchored by the overrunning brake 96 against rotation, ring gear 86 and the power output shaft 88 are driven in a forward driving direction at a reduced speed relative to the speed of rotation of the shaft 38.

To establish a speed ratio change from the low speed ratio to an intermediate speed ratio it merely is necessary to engage the front brake band 62. This anchors sun gear 76 so that it now is capable of acting as a reaction member. Carrier 94 then is caused to overrun the stationary housing, the brake 96 permitting this to occur. Ring gear 86 and power output shaft 88 then are driven at an increased speed ratio that is greater than the low speed ratio but less than unity.

A subsequent upshift to the high speed ratio from the intermediate speed ratio is accomplished by releasing the brake band 62 and engaging the rear clutch in timed relationship while the front clutch remains applied. The pressure release chamber of the front brake servo and the front clutch servo are provided with a common feed passage system for this purpose. Thus the sun gears 76 and 78 become locked together so that the entire gear system rotates in unison with a 1–1 speed ratio. The overrunning coupling 96 continues to overrun under these conditions.

If coast-braking is desired during operation in the first speed ratio or if continuous operation in the low speed ratio is desired with no upshift to the intermediate speed ratio, the brake band 100 can be applied by appropriately shifting a driver operated manual valve to permit fluid pressure to be admitted to passage 108. Brake band 100 then supplements the action of overrunning coupling 96 and prevents rotation of the carrier 94 in either direction.

To establish reverse drive operation it merely is necessary to release the front clutch and apply the rear clutch as the rear brake band 100 is applied. Turbine torque then is delivered through the rear clutch to the sun gear 76. The carrier 94 again acts as a reaction member since it is anchored by the brake band 100. Ring gear 86 and the power output shaft 88 then are driven in a reverse direction as sun gear 76 acts as a power input member.

One embodiment of the servo that is indicated generally in FIGURE 1 by reference character 64 is illustrated more particularly in FIGURE 2. It includes a cylinder 118 within which is positioned a piston 120. This piston includes a sleeve-like extension 122 which is received within a servo sleeve 124. This sleeve is secured within the cylinder 118 and held axially fast by snap ring 126 and by a cooperating shoulder 128. A fluid seal 130 located in a cooperating seal groove in the extension 122 provides sealing action with the interior surface of the sleeve 124.

Piston 120 is biased in a left-hand direction, as viewed in FIGURE 2, by a piston return spring 132 which is seated against the end wall 134 of the cylinder 118.

When the piston 120 assumes the position shown in FIGURE 2, it engages end wall 136 of the sleeve 124. This sleeve is formed with a seal groove within which is positioned a packing material 138.

Piston sleeve extension 122 defines an inner cylinder 140 within which is slidably positioned an accumulator piston 142. A sealing ring 144 is situated within a sealing ring groove formed in the piston 142 and it is engaged slidably with the inner cylindrical surface of the cylinder 140. Accumulator spring 146 acts against the piston 142 and is seated by a spring seat member 148 which extends radially inwardly across the end of the sleeve 124. The radially outward portion of the seat member 148 is formed with apertures 150 that receive projections 152 carried by the extension 124.

A servo piston stem 154 is slidably received within an opening 156 formed in a hub sleeve 158 of the cylinder 118. It is adapted to engage the linkage mechanism 72 indicated in FIGURE 1 to apply the brake band 62. The stem includes a reduced diameter portion 160 which is received within the piston 120. A shoulder 162 formed on the stem is engaged by the piston 120 so that the pressure forces acting upon the piston 120 in a right-hand direction are transmitted to the stem 154 thus causing it to urge the lever 72 in FIGURE 1 in a counter-clockwise direction to apply the brake band 62.

Stem 154 includes also an extension 164 that is received slidably through a cooperating opening 166 in the accumulator piston 142. Piston 142 thus cooperates with the piston 120 to define an accumulator chamber indicated at 168. This chamber is in fluid communication with the annular pressure chamber or cavity defined by the piston 120 and the cooperating cylinder 118. This latter chamber is identified by reference character 170 and communication between chambers 168 and 170 is provided by a flow restricting orifice 172.

Fluid pressure can be admitted to the chamber 170 through a passage that is identified in FIGURE 1 by reference character 174. Fluid pressure may be admitted to the chamber on the right-hand side of the piston 120 through a separate feed passage 176 to release the brake. This latter chamber is identified by reference character 178.

The embodiment of FIGURE 3 is substantially identical in construction with the embodiment of FIGURE 2 although I have eliminated the spring seat member 148. Instead I have substituted a flanged sleeve extension 180 which forms a part of the sleeve 124'. It includes a radially inwardly extending flange 182 against which the spring 146 may be seated.

The remaining portion of the structure of FIGURE 3 may be the same as the corresponding portions of the structure of FIGURE 2. For this reason, identical reference characters have been used to designate the various elements although primed notations have been added.

To apply the brake servo 64 it is merely necessary to introduce pressure through passage 174 to the chamber 170. This causes an immediate pressure build-up in the chamber 170 which in turn creates a brake band applying force. In FIGURE 4 the portion of the brake applying force that is due to this pressure build-up is indicated by the curve A. It will be observed that following initial introduction of pressure into the chamber 170, the pressure builds up very quickly to a value that is designated as a balance band force. Thus the servo may be calibrated so that the force applied to the band due to the pressure build-up in chamber 170 is sufficient to initiate the braking action.

As chamber 170 becomes pressurized, fluid is transferred through the flow restricting orifice 172 thereby gradually pressurizing the chamber 168. As the pressure in chamber 168 begins to build up, accumulator piston 142 begins to stroke in a left-hand direction, as viewed in FIGURE 2, against the opposing force of spring 146. As the spring 146 yields, the pressure in chamber 168 increases accordingly in a linear relationship as indicated by the curve B in FIGURE 4. This stroking action continues until the piston 142 bottoms out against the seat member 148. Thereafter, the band apply force due to the pressure in chamber 168 remains constant.

In FIGURE 4, I have shown with curve C the sum of the band forces that are created by the pressure in chambers 170 and 168. It may be observed that the total force applied to the band increases rapidly during the initial stages of the band apply cycle. Thereafter a gradual pressure build-up occurs as the brake drum begins to decelerate. After the accumulator piston has fully stroked, the total band apply force is equal to the sum of the forces resulting from the pressures in both servo apply chambers.

This cushioning action substantially improves the shift quality and increases band durability. Unlike conventional accumulator systems, undue slipping of the band during the initial stages of the braking cycle is eliminated since the pressure force applied by the servo increases very rapidly during the initial pressure build-up stage.

My improved accumulator system is distinguished from conventional systems also in that the rate of change of the force applied to the piston during the accumulation period is reduced for any given accumulator capacity. This can be shown analytically as follows:

(1) $$Q = KA_0\sqrt{\Delta P}$$

and (2) $$P_a = P_L - \Delta P$$

Substituting (2) in (1) gives:

(3) $$Q = KA_0\sqrt{P_L - P_a};$$

but (4) $$Q = dV_a/dt$$

and (5) $$V_a = A_a\frac{F_a}{K_a} = \frac{A_a^2 P_a}{K_a}$$

where (6) $$P_a = \frac{F_a}{K_a} \text{ and } \frac{F_a}{K_a} = \text{stroke}$$

Therefore, (7) $$Q = \frac{dV_a}{dt} = \frac{A_a^2}{K_a}\frac{dP_a}{dt} = KA_0\sqrt{P_L - P_a}$$

Rewriting (7) gives:

(8) $$\frac{dP_a}{dt} = \frac{K_a KA_0}{A_a^2}\sqrt{P_L - P_a} = \frac{K_a}{A_a^2}Q$$

The balanced force equation for the servo piston is:

(9) $$F_0 = P_L A_1 + P_a A_2 - F_3$$

Differentiating (9) gives:

(10) $$\frac{dF_b}{dt} = \frac{A_a dP_a}{dt} = \frac{K_a A_2}{A_a^2}Q$$

For the purposes of the foregoing analysis, the following nomenclature is used.

Nomenclature $K$ = Orifice coef.
$\Delta P$ = Pres. drop across orifice.
$A_0$ = Orifice area.
$Q$ = Vol. rate of flow.
$A_a$ = Acc. area.
$K_a$ = Acc. springrate.
$V_a$ = Acc. vol.
$tb$ = Bal. time.
$F_a$ = Acc. springforce.
$P_a$ = Acc. pres.
$P_L$ = Line pres.
$F_s$ = Ret. sprg. force.
$A_1$ = Primary area.

It will be apparent from Equation 10, that the rate of change of force acting upon the band is proportional to the pressure area of the chamber 168. The total force acting upon the band is determined by the force acting upon both areas, but the rate of change of force is determined only by the pressure build-up on area of the chamber 168.

In contrast, the expression for the force balance in a conventional system can be written as follows:

(11)

$$\frac{dF_b}{dt} = \frac{A_d dP_a}{dt} = \frac{K(A_1+A_2)}{A_a^2}Q = \frac{KA_1 Q}{A_a^2} + \frac{KA_2 Q}{A_a^2}$$

It will be observed from this that the rate of change of force is substantially greater in conventional systems by reason of the increased servo area over which the accumulator is caused to act.

It follows from the foregoing analysis that for any given accumulator capacity, the rate of change of force acting upon the band is reduced in my improved system because the accumulator action occurs on only a portion of the total piston area for the servo. If, however, the rate of change of force in an arrangement of this type is to be made equal to the corresponding rate of change of the force in a conventional accumulator system, it will be possible to reduce substantially the capacity of the accumulator. This being the case, it is possible to reduce the overall size of the accumulator and locate it physically within the servo piston as I have taught in my foregoing description.

Having thus described preferred embodiments of my invention, what I claim and desire to secure by United States Letters Patent is:

1. A fluid pressure operated servo comprising a cylinder, a piston located within said cylinder, said piston defining in part a fluid pressure cavity, said piston being adapted to act upon a movable member, an acuumulator mechanism comprising an accumulator chamber of variable volume, said accumulator chamber being defined in part by said piston and means for introducing fluid pressure to said accumulator chamber from said cavity at a controlled rate.

2. A fluid pressure operated servo comprising a cylinder, a piston disposed in said cylinder, said piston defining in part a pressure cavity, means for distributing fluid pressure to said cavity thereby creating a piston force, means for transmitting said piston force to a movable member, an accumulator mechanism comprising relatively movable portions cooperating to define an accumulator chamber, said accumulator chamber being defined in part by said piston, spring means for resisting relative motion of said movable portions, and means for introducing fluid under pressure to said accumulator chamber from said pressure cavity at a controlled rate.

3. A fluid pressure operated servo comprising a cylinder, a piston located within said cylinder, said piston defining in part a fluid pressure cavity, said piston being adapted to act upon a movable member, an accumulator mechanism comprising an accumulator chamber of variable volume defined in part by said piston, said accumulator chamber being in fluid communication with said cavity, and a flow restricting orifice establishing said fluid communication between said cavity and said chamber.

4. A fluid pressure operated servo comprising a cylinder, a piston disposed in said cylinder, said piston defining in part a pressure cavity, means for distributing fluid pressure to said cavity, thereby creating a piston force, means for transmitting said piston force to a movable member, an accumulator mechanism in said piston comprising relatively movable portions cooperating to define an accumulator chamber, spring means for resisting relative motion of said movable portions and means for introducing fluid under pressure to said accumulator chamber including a flow restricting orifice between said chamber and said cavity.

5. A fluid pressure operated servo comprising a cylinder, a servo piston located in said cylinder, an accumulator piston located within said servo piston, said pistons cooperating to define an accumulator chamber, spring means for resisting relative motion between said pistons, said servo piston and said cylinder cooperating to define a main pressure chamber, means for distributing fluid under pressure to said main pressure chamber, and a flow restricting orifice between said main pressure chamber and said accumulator chamber.

6. In a friction brake for a power transmission mechanism, a fluid pressure operated servo for applying and releasing said friction brake including a cylinder, a piston located in said cylinder and cooperating therewith to define a main pressure chamber, a piston return spring adapted to urge normally said piston to a brake releasing position, means for introducing fluid under pressure into said cylinder thereby creating a pressure force upon said piston that may be transmitted to movable portions of said friction brake means, an accumulator cylinder located in said piston, an accumulator piston located in said accumulator cylinder and cooperating therewith to define an accumulator pressure cavity, an accumulator spring means for resisting relative motion of said pistons, and a flow restricting orifice between said main chamber and said accumulator chamber, the pressure force established by the fluid pressure in said main chamber being effective to initiate engagement of said friction brake means, said initial engaging pressure force being followed by subsequent gradual pressure increase upon a pressure build-up in said accumulator chamber until an ultimate pressure apply force is achieved.

References Cited by the Examiner
UNITED STATES PATENTS

| | | | |
|---|---|---|---|
| 2,667,150 | 1/1954 | Coar | 123—119 |
| 3,099,172 | 7/1963 | Jania et al. | |

FOREIGN PATENTS 933,186   9/1955   Germany.

SAMUEL LEVINE, *Primary Examiner.*

RICHARD B. WILKINSON, *Examiner.*

UNITED STATES PATENT OFFICE
CERTIFICATE OF CORRECTION

Patent No. 3,241,464            March 22, 1966

Stanley L. Pierce, Jr.

It is certified that error appears in the above identified patent and that said Letters Patent are hereby corrected as shown below:

Column 6, equation 9, the symbol "$F_o$" should read -- $F_b$ --; same equation, the symbol "$F_3$" should read -- $F_s$ --. Column 6, equation 10, the symbol "$A_a$" should read -- $A_2$ --.

Signed and sealed this 3rd day of November 1970.

(SEAL)
Attest:

Edward M. Fletcher, Jr.        WILLIAM E. SCHUYLER, JR.
Attesting Officer              Commissioner of Patents